United States Patent [19]

Crawley

[11] 3,709,356
[45] Jan. 9, 1973

[54] VERTICAL BALE ELEVATOR

[75] Inventor: Harry Donald Crawley, Winnipeg, Canada

[73] Assignee: Allied Farm Equipment (Manitoba) Ltd., Winnipeg, Manitoba, Canada

[22] Filed: March 1, 1971

[21] Appl. No.: 122,571

[52] U.S. Cl................................198/162, 198/7 BL
[51] Int. Cl............................................B65g 15/14
[58] Field of Search...................198/7 BL, 162, 165

[56] References Cited

UNITED STATES PATENTS

| | | | |
|---|---|---|---|
| 2,916,138 | 12/1959 | Hume | 198/165 |
| 351,190 | 10/1886 | Mayberry | 198/165 |
| 3,301,372 | 1/1967 | Malmgren | 198/7 BL |
| 2,089,516 | 8/1937 | West | 198/162 X |
| 2,785,810 | 3/1957 | Kneib | 198/7 BL |

*Primary Examiner*—Edward A. Sroka
*Attorney*—Kent & Ade

[57] ABSTRACT

An inner vertical elevator is secured between the feed-in section and the upper horizontal mow conveyor. An outer elevator is supported by parallel linkage in front of the inner elevator with the bales engaged by the conveyor chains of the two elevators. Tension springs govern the engagement of the conveyors with the bale and a conveyor thrower takes the bales from the vertical elevator and transfers them to the mow conveyor.

8 Claims, 8 Drawing Figures

VERTICAL BALE ELEVATOR

This invention relates to new and useful improvements in vertical bale elevators.

Conventionally such elevators include a conveyor chain having prongs or teeth extending therefrom which pick up bales from a feed-in conveyor and move then vertically and then transfer them to a mow conveyor. Usually an inner section is provided with an endless chain and various spring loaded plates or the like are provided to maintain the vertical bales against the inner elevator. Alternatively, guide rails may be provided but unfortunately bales are not always in the same dimensions or weight so that it becomes difficult to adjust the relationship between the retaining means and the inner conveyor in order that the bales will be moved upwardly without slippage occurring. This problem becomes particularly acute when the vertical distance exceeds 10 or 12 feet.

Once the bales reach the upper end of the conveyor, it is necessary to flip them over so that they can be engaged by the substantially horizontal mow conveyor and various spring loaded flipper arms have been provided in the past to accomplish this. However, once again due to the fact that bales are of different dimensions and weights, hang ups occur or the bales are not moved sufficiently to enable them to lie flat upon the horizontal mow conveyor.

The present invention overcomes all of these disadvantages by providing outer and inner conveyors with adjustable spring biassing means between the two conveyors so that the pressure of the outer conveyor component can be adjusted to bear against the bales being carried upwardly. Furthermore, the thrower section is also provided with its own conveyor chain thus ensuring that the bales are moved clear of the vertical conveyor onto the mow conveyor.

The principal object and essence of the invention is to provide a device of the character herewithin described which includes an inner conveyor section situated vertically between the feed-in conveyor and the mow conveyor and having an outer component mounted upon pairs of parallel arms and biased to control the pressure of the outer component against the bales passing therebetween.

Another object of the invention is to provide a device of the character herewithin described in which the vertical height is virtually without limit inasmuch as different sections can be added to adjust the vertical height to the exact dimension required. Under these circumstances, auxiliary spring supports are provided to take the weight of the outer component.

Another object of the invention is to provide a device of the character herewithin described which includes means on the thrower section positively to urge the bales from the vertical component to the horizontal mow conveyor.

Another object of the invention is to provide a device of the character herewithin described which is easily assembled and adjusted during use.

Still another object of the invention is to provide a device of the character herewithin described which is simple in construction, economical in manufacture, and otherwise well suited to the purpose for which it is designed.

With the considerations and inventive objects herein set forth in view, and such other or further purposes, advantages or novel features as may become apparent from consideration of this disclosure and specification, the present invention consists of the inventive concept which is comprised, embodied, embraced, or included in the method, process, construction, composition, arrangement or combination of parts, or new use of any of the embodiments of such concept, reference being had to the accompanying figures in which.

In the drawings like characters of reference indicate corresponding parts in the different figures.

Figure 1:
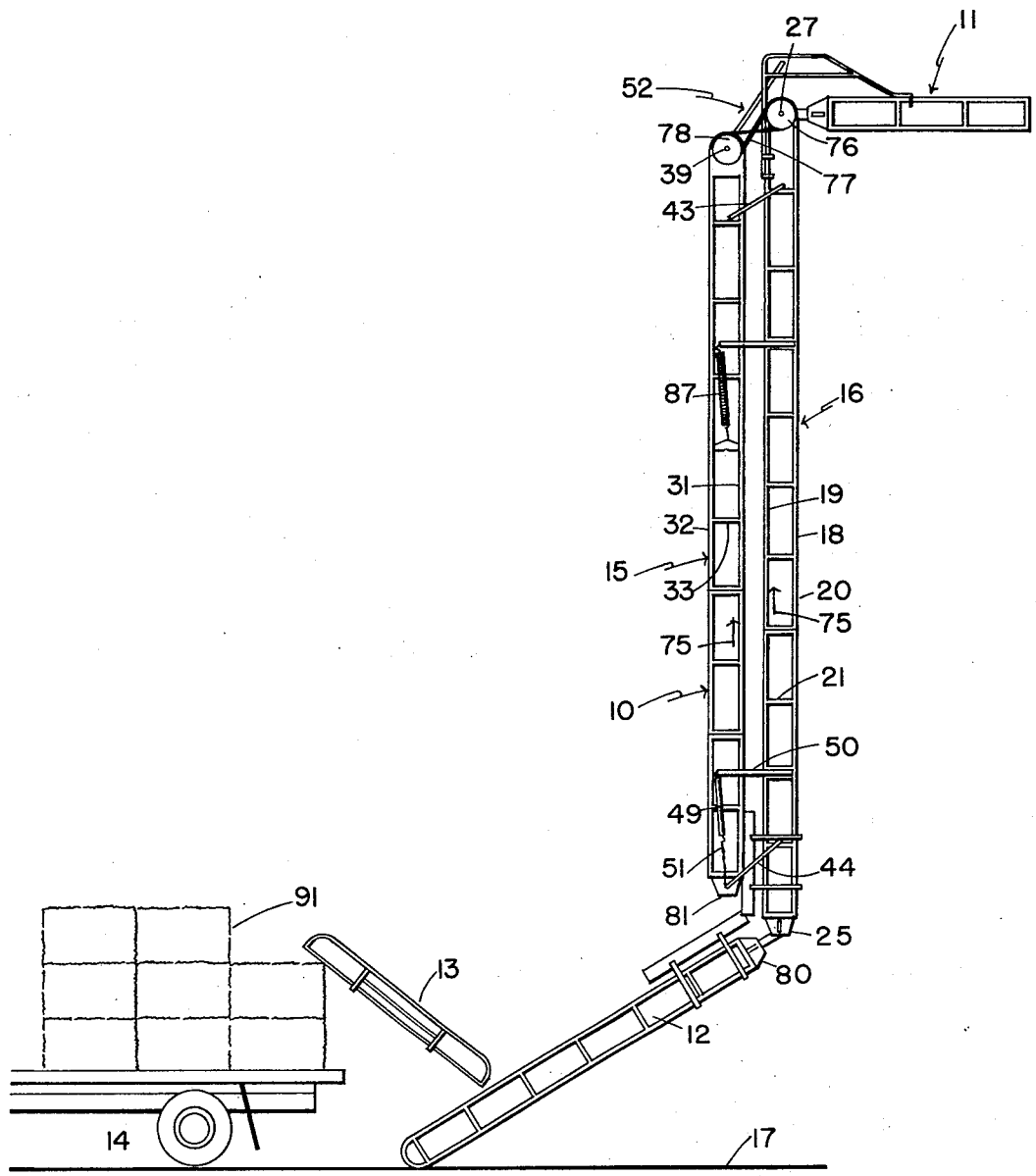
FIG. 1 is a partially schematic side elevation showing the device in the operating position together with a feed-in conveyor and a mow conveyor section.

Proceeding therefore to describe the invention in detail, reference should first be made to FIG. 1 in which 10 illustrates generally the vertical bale elevator, connected by the upper end thereof to a conventional, substantially horizontal mow conveyor 11.

An inclined feed-in conveyor 12, conventional in structure, is connected to the lower end of the vertical bale elevator 10 and a tubular bale chute 13 extends between a truck 14 carrying bales and the lower end of the feed-in conveyor.

In detail, the vertical bale elevator 10 includes an outer elevator component collectively designated 15 and an inner elevator component collectively designated 16.

It should be observed that the inner and outer components are preferably made in sections of varying lengths so that the desired vertical distance can be obtained between the mow conveyor 11 and the ground level upon which the truck 14 is situated and which is indicated by reference character 17.

However, as this is for convenience, the entire inner and outer components will be described as though they consist of one portion.

The inner component 16 includes framework 18 comprising front and rear vertical pairs of members 19 and 20 respectively and bridged by horizontal braces 21.

Transverse braces 22 extend between the inner vertical members 18 thus defining a substantially U-shaped conveyor casing within which an endless conveyor chain 23 is mounted. This inner conveyor chain 23 is conventional and includes prongs or teeth 24 extending therefrom at intervals therealong.

A shaft 25 (see FIG. 2) extends across the lower end of the component 16 and mounts a sprocket 26 thereon around which the endless conveyor chain 23 engages, said sprocket acting as an idler sprocket as will hereinafter become apparent.

Figure 5:
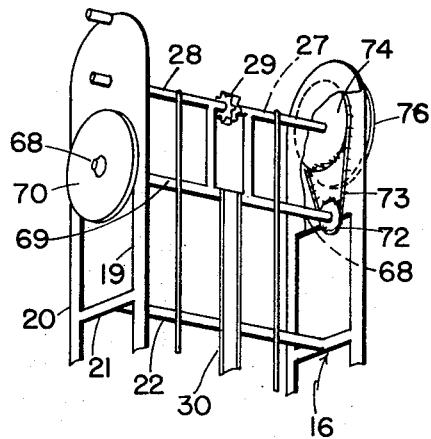
FIG. 5 is a fragmentary isometric view partially schematic, showing the upper end of the inner component with the drive means.

A further shaft 27 (see Fig. 5) is bearably supported within a cross tube 28 spanning the upper end of the inner component and this tube 28 is split in the center thereof so that a drive sprocket 29 may be secured to the shaft at this point.

A chain supporting channel 30 is secured to the cross members 22 and extends downwardly centrally of the inner component 16, it being understood that the aforementioned conveyor chain 23 extends around drive sprocket 29.

The outer component 15 is constructed similarly to the inner component 16 and includes inner and outer pairs of vertical members 31 and 32 respectively together with the cross braces 33 and transverse members 34 once again defining a substantially U-shaped channel which faces inwardly to the inner conveyor 16.

A shaft 35 spans the lower end of the outer conveyor 15 and is provided with an idler sprocket 36 thereon around which the endless conveyor chain 37 extends having teeth 38 thereon similar to teeth 24 hereinbefore described.

Figure 6:
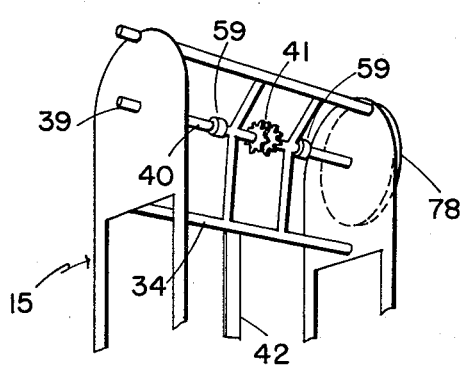
FIG. 6 is a view similar to FIG. 5 but showing the upper end of the outer component with the drive means.

Shaft 39 is bearably supported within the split cross tube 40 extending across the upper end of the outer conveyor and shown in detail in FIG. 6. A double sprocket wheel collectively designated 41 is secured to the shaft between the two parts of the tube 40 and a conveyor chain channel 42 extends from top to bottom of the outer conveyor centrally thereof within which the conveyor chain 37 runs, it being understood that this conveyor chain engages around one of the sprockets of the double sprocket assembly 41.

Figure 3:
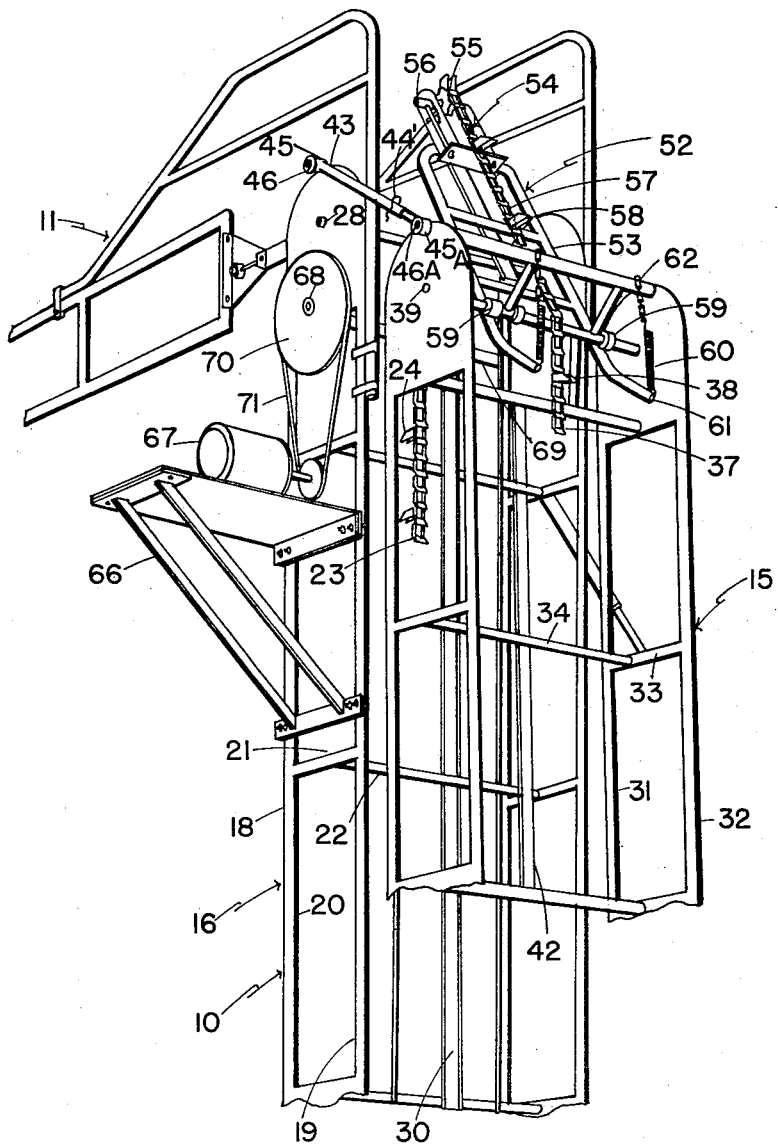
FIG 3 is an enlarged isometric view of the upper end of the vertical bale elevator and showing part of the mow conveyor.

The outer component is mounted to the inner component for floating action and this mounting includes upper and lower pairs of arms 43 and 44 respectively. Reference to FIG. 3 will show one of the upper pairs of arms 43.

These arms are telescopic and are adjusted in length within limits by means of pins 44′ engaging apertures (not illustrated).

The arms 43 are pivotally secured by one end thereof by means of a bearing tube 45 engaging around a mounting pin 46 extending adjacent the upper end of the inner conveyor component 16.

The other end of the arms 43 is also provided with a bearing tube 45A engaging around a pin 46A extending from adjacent the upper end of the outer component 15.

Figure 2:
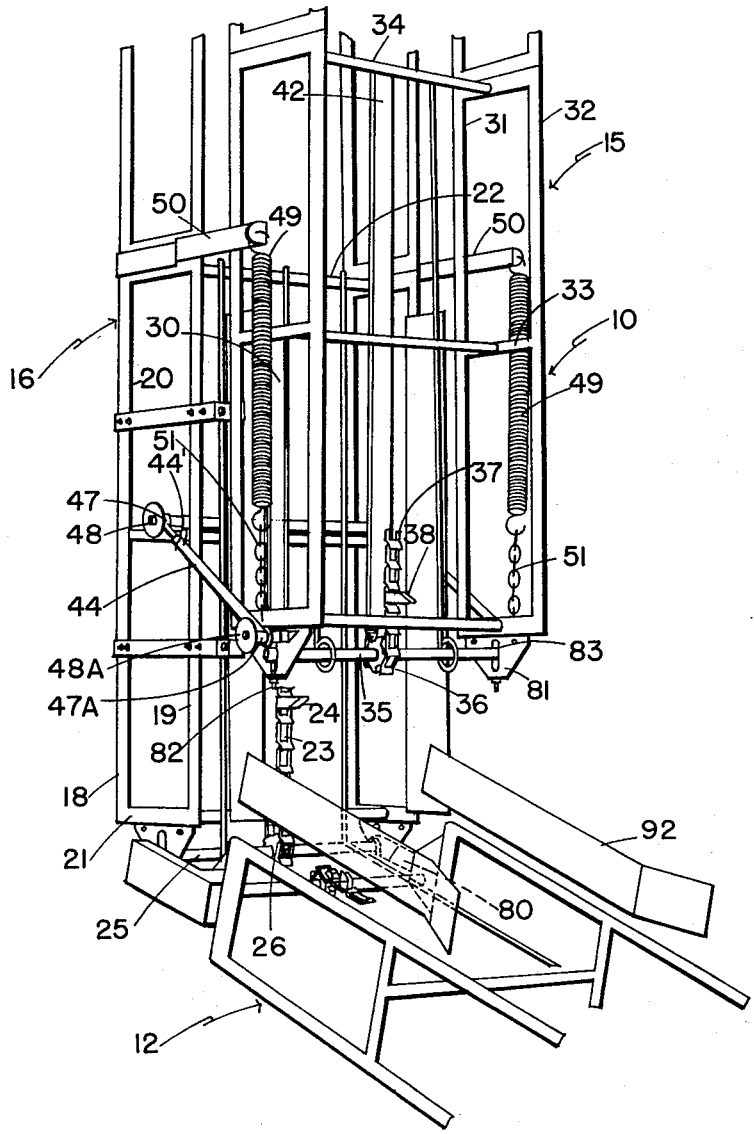
FIG. 2 is an enlarged fragmentary isometric view of the lower end of the vertical bale elevator and showing part of the feed-in conveyor.

Reference to FIG. 2 will show the lower arms 44 which are constructed in a similar way to the upper arms. These arms are also telescopic and adjusted by means of pins 44′ and are connected by one end thereof through a bearing tube 47 engaging over a pin 48 extending from adjacent the lower end of the inner component 16.

Similar bearing tubes 47A engage over pins 48A which extend from the lower end of the outer component 15.

Upper and lower pairs of arms 43 and 44 form parallel linkage between components 15 and 16 and permit the outer component 15 to move upwardly and downwardly in an arc relative to the inner component but to remain parallel thereto at all times.

Under normal conditions, the weight of the outer component would urge it or bias it in contact with the inner component but means are provided to control this biassing and take the form of a pair of tension springs 49 secured by the upper ends thereof to an outwardly extending member 50 secured to the inner component frame.

Reference to FIG. 2 shows this mounting with the other end of the springs 49 hooked into the distal end of the bars 50. A chain 51 is adjustably secured to the lower end of the springs 49 and in turn hooks over the pin 48A upon which arms 44 are mounted. By adjusting the connection of the chain to the lower end of springs 49, the tension of the springs is adjusted and hence the floating action of the outer component 15 relative to the inner component 16.

Mounted to the upper end of the outer component 15 is a thrower section collectively designated 52. This thrower section 52 includes a substantially rectangular frame 53 having a conveyor collectively designated 54 secured thereto. This conveyor includes an upper idler sprocket 55 mounted upon a shaft 56 spanning the upper end of the thrower section.

An endless conveyor chain 57 extends around sprocket 55 and is provided with bale engaging teeth 58 extending therefrom in a manner similar to the conveyor chains hereinbefore described.

Towards the lower end of the frame 53 is a pair of bearing sleeves 59 which engage around the aforementioned tube 40 extending across the upper end of the outer conveyor 15 and the thrower section conveyor chain 57 extends around the other of the double sprocket component 41 mounted on shaft 39 thus providing drive to the thrower section. These bearing sleeves 59 mount the thrower section intermediate the ends of the frame, to the outer component and the thrower section normally inclines upwardly and inwardly from the upper end of the outer component 15 towards the inner component 16 and overlies the upper end of the horizontal mow conveyor 11.

Tension springs 60 are anchored by one end thereof to the lower ends 61 of the thrower section frame 53 and these springs extend to lengths of chain 62 which in turn extend to lugs 63 on the frame 53 but spaced from ends 61. These chains pass over the upper cross member specifically designated 64 of the outer component 15 and one link of these chains is adapted to engage over projecting pins 65 which extend upwardly from this cross member 64.

It will therefore be observed that the engagement of the links of the chains 62 over the pins 65 gives a basic angle of adjustment to the thrower section and if a bale moves the thrower section upwardly around the shaft 39, tension springs 60 extend and apply downward pressure of the thrower section upon the bale thus ensuring adequate engagement of the bale with the conveyor chain teeth 58.

Reference to FIG. 3 will show a platform 66 situated to one side of the inner component 16 adjacent the upper end thereof and a source of power 67 in the form of an electric motor is mounted upon this platform.

A main drive shaft 68 spans the upper end of the inner component 16 being journalled through a cross tube 69 and a pulley 70 is secured to one end of shaft 68.

A belt 71 extends around this pulley and around a pulley on the inner end of the electric motor 67.

A sprocket wheel 72 is secured to the other end of shaft 68 and a chain 73 extends around this sprocket wheel and around a further sprocket wheel 74 secured to the end of shaft 27 thus providing power for the inner conveyor chain 23 and driving same so that the inner run moves upwardly in the direction of arrow 75 (see FIG. 1). A further puller 76 is mounted upon end of shaft 27 and a crossed belt 77 engages around this pulley and around a further pulley 78 secured to the end of shaft 39 thus driving the conveyor chain 37 of the outer component 15 also in the direction of arrow 75.

The fact that the thrower section conveyor chain 57 engages around the double sprocket 41 ensures that drive is provided for the thrower section conveyor chain 57 so that the inner run thereof moves in the direction of arrow 79.

A conventional sprocket and chain assembly 80 connects between the lower end of the inner component conveyor to the conveyor of the feed-in component 12 but as this construction is conventional, it is not believed necessary to describe same further.

The cross shaft 35 spanning the lower end of the outer conveyor 15 is mounted within triangular plates 81 and conventional chain tensioning devices or chain adjustment devices 82 cooperate between the shaft 35 and the vertical slots 83 within these triangular brackets.

Figure 7:
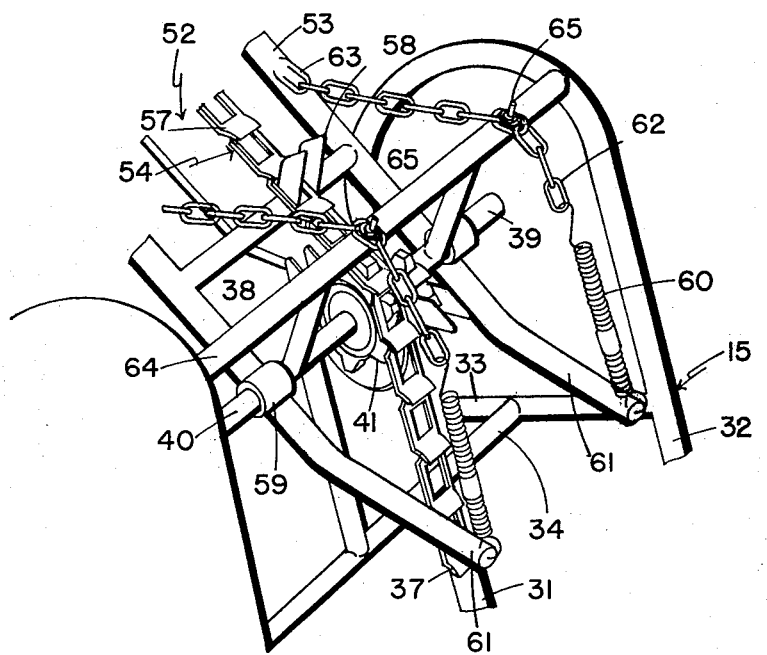
FIG. 7 is an enlarged isometric fragmentary view of the upper end of the thrower section showing the adjustment means.
Figure 4:
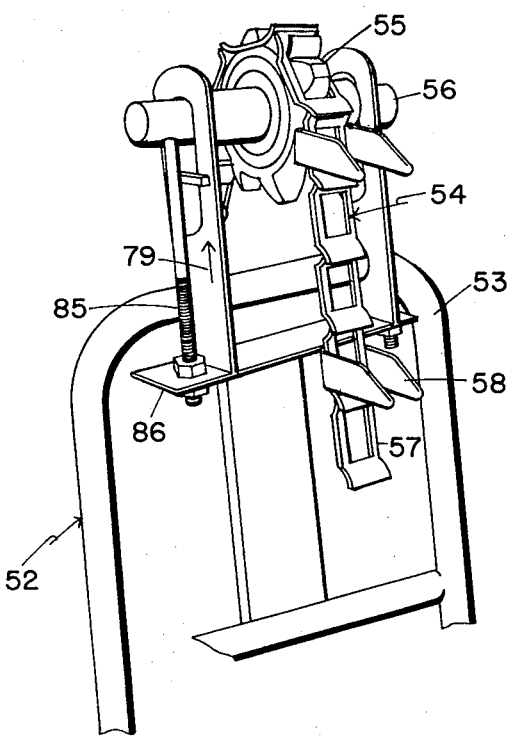
FIG. 4 is an enlarged fragmentary isometric view showing the mounting of the thrower section to the outer component.

FIG. 7 shows details of the adjustment of the tension of the thrower section chain 57. The upper cross shaft 56 is mounted within vertical slotted plates 84 which extend upwardly from the thrower section frame 53. Adjustable bolts and nuts 85 extend between shaft 56 and a fixed plate 86 situated therebelow.

If the vertical elevator exceeds approximately 20 ft., it is necessary to provide auxiliary springs to assist the main floating springs 49.

Figure 8:
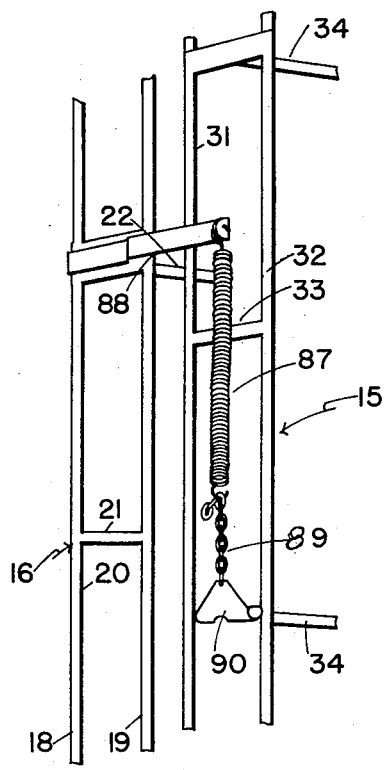
FIG. 8 is a fragmentary isometric view showing the connection of the auxiliary springs between the two components.

These are identified by reference character 87 and shown in detail in FIG. 8. Horizontal brackets 88 are secured to the inner component frame and extend to the sides of the outer component frame. Springs 87 are hooked to the distal ends of these brackets and adjustment chains 89 are secured to the lower end of springs 87. Hooked brackets 90 are in turn secured to chains and these brackets are adapted to engage over a convenient cross member 21 on the outer component frame. These assist the previously mentioned springs 49 in giving floating action to the outer component 15.

In operation, bales 91 are manually placed upon the tubular bale chute 13 and feed by gravity to the lower end of the hinged feed-in conveyor 12 which moves the bales upwardly towards the lower end of the vertical bale conveyor.

As they reach the upper end of the feed-in conveyor, bale deflector plates 92 center the bales and the teeth 24 of the inner component chain 23 engage the end of the bale and lift it upwardly until the teeth 38 of the conveyor chain 37 of the outer conveyor can also engage the bale and straighten it up to the vertical position.

In this connection it will be observed that the lower end of the outer component 15 is normally positioned above the lower end of the inner component 16.

As the bale is engaged by the lower end of the outer conveyor component 15, the fact that it is still at a slight angle will cause the outer component to move upwardly in the direction of arrow 75 around the links 43 and 44 thus widening the gap between the two components and allowing the bale to enter. As soon as the bale is in the vertical position, the weight of the outer component 15 will move it downwardly governed by the tension in springs 49 (and if installed, additional springs 87) thus ensuring that the outer conveyor chain engages the bale firmly and presses same against the inner conveyor chain. These two chains, which are moving at the same speed, move the bales upwardly positively and without any slippage until they become engaged by the conveyor chain 57 of the thrower section 52. Due to the inclination of this thrower section, the bales are urged over and onto the mow conveyor 11 and this is controlled by the pressure of springs 60 together with the basic adjustment of chains 62.

Chain tension on the elevator sections is provided as hereinbefore described.

When setting up, the distance between the conveyor chains of the inner and outer sections (measured from the tips of the teeth 24 and 38) should be approximately 1 to 2 inches less than the thickness of a bale. When using the auxiliary or supplementary support springs 87, they should be installed before the lower springs 49 and adjusted so that there is 9 inches between the tips of the teeth. When the lower springs are installed and adjusted, the distance between the teeth is then reduced to between 1 and 2 inches. If the bales hesitate upon entering the vertical conveyor or on the way up, the outer elevator is lowered by adjusting the lower spring chains 51 to apply more pressure. On the other hand if the bales bend excessively as they enter the vertical conveyor or drag heavily on the way up, then the outer elevator should be raised by adjusting the chains 51.

If the bales leave the vertical conveyor bottom first, the tension on springs 60 of the thrower section should be increased so that the correct action is obtained.

Various modifications can be made within the scope of the inventive concept which is herein disclosed and/or claimed.

What I claim as my invention is:

1. A vertical bale elevator adapted to be connected between a feed-in conveyor and a mow conveyor comprising in combination an inner elevator component and an outer elevator component, means mounting said outer elevator component to said inner elevator component for floating movement, the weight of said outer component biassing same downwardly towards said inner component, means controlling said biassing of said outer component towards said inner component and an endless conveyor chain assembly in one of said components adapted to engage associated bales received from the feed-in conveyor, and a thrower section mounted on the upper end of said outer conveyor component and extending diagonally upwardly and inwardly towards said inner component, for transferring bales from said vertical bale elevator to the associated mow conveyor; said thrower section including a frame, an endless conveyor on said frame, said frame being pivotally secured intermediate the ends thereof to said outer component for swinging action in a vertical plane, and adjustable spring means extending between the outer ends of said frame and said outer component for biassing said thrower section downwardly and inwardly towards said inner conveyor, and a source of power operatively connected to said conveyor and to said thrower section conveyor.

2. The device according to claim 1 which includes an endless conveyor chain assembly on the other of said components.

3. The device according to claim 1 in which said means mounting said outer components to said inner components includes upper and lower pairs of parallel links pivotally secured between said components.

4. The device according to claim 2 in which said means mounting said outer components to said inner components includes upper and lower pairs of parallel links pivotally secured between said components.

5. The device according to claim 1 in which said means controlling the biassing of said outer component towards said inner component includes at least one pair of tension springs, anchoring means on one of said components for securing said springs by one end thereof, adjustable anchoring means on the other of said components for securing said spring by the other ends thereof.

6. The device according to claim 2 in which said means controlling the biassing of said outer component towards said inner component includes at least one pair of tension springs, anchoring means on one of said components for securing said springs by one end thereof, adjustable anchoring means on the other of said components for securing said spring by the other ends thereof.

7. The device according to claim 3 in which said means controlling the biassing of said outer component towards said inner component includes at least one pair of tension springs, anchoring means on one of said components for securing said springs by one end thereof, adjustable anchoring means on the other of said components for securing said spring by the other ends thereof.

8. The device according to claim 4 in which said means controlling the biassing of said outer component towards said inner component includes at least one pair of tension springs, anchoring means on one of said components for securing said springs by one end thereof, adjustable anchoring means on the other of said components for securing said spring by the other ends thereof.

* * * * *